(12) United States Patent
Albright et al.

(10) Patent No.: US 6,467,945 B1
(45) Date of Patent: Oct. 22, 2002

(54) DISCHARGE APPARATUS FOR A MIXER FOR MIXING AND DISCHARGING LIVESTOCK FEED AND THE LIKE

(75) Inventors: Christopher Albright, Brodhead; Ric Joranlien, Monroe, both of WI (US)

(73) Assignee: Knight Manufacturing Corp, Brodhead, WI (US)

(*) Notice: Subject to any disclaimer, the term of this patent is extended or adjusted under 35 U.S.C. 154(b) by 2 days.

(21) Appl. No.: 09/590,347

(22) Filed: Jun. 8, 2000

Related U.S. Application Data

(63) Continuation-in-part of application No. 09/562,167, filed on May 2, 2000, now Pat. No. 6,409,376.

(51) Int. Cl.[7] ............................. B01F 7/24; B01F 15/02; B02C 13/286
(52) U.S. Cl. ...................... 366/196; 366/314; 366/603; 241/101.761; 241/260.1; 241/605
(58) Field of Search ................................. 366/192, 193, 366/194, 195, 196, 314, 603; 241/101.761, 101.76, 260.1, 605, 101.74

(56) References Cited

U.S. PATENT DOCUMENTS

| | | | | | |
|---|---|---|---|---|---|
| 4,003,502 A | * | 1/1977 | Barcell | ................ | 241/101.761 |
| 4,106,706 A | * | 8/1978 | Barrows | ............... | 241/101.761 |
| 5,082,188 A | * | 1/1992 | Urich | ................... | 241/101.761 |
| 5,143,221 A | * | 9/1992 | Faccia | ......................... | 366/186 |
| 5,154,510 A | * | 10/1992 | Faccia | ......................... | 366/193 |
| 5,240,321 A | * | 8/1993 | Miller | ...................... | 241/260.1 |
| 5,294,064 A | * | 3/1994 | Faccia | .................... | 241/101.74 |
| 5,429,436 A | * | 7/1995 | Stone | .......................... | 366/314 |
| 5,456,416 A | * | 10/1995 | Hartwig | ....................... | 366/314 |
| 5,462,354 A | * | 10/1995 | Neier | ........................... | 366/314 |
| 5,505,537 A | * | 4/1996 | Previero | ...................... | 366/196 |
| 5,553,937 A | * | 9/1996 | Faccia | .......................... | 366/302 |
| 5,615,839 A | * | 4/1997 | Hartwig | .................... | 241/260.1 |
| 5,647,665 A | * | 7/1997 | Schuler | ........................ | 366/196 |
| 5,863,122 A | * | 1/1999 | Taminga | ....................... | 366/314 |

* cited by examiner

Primary Examiner—Tony G. Soohoo
(74) Attorney, Agent, or Firm—David J. Archer

(57) ABSTRACT

A discharge apparatus of the type disclosed in co-pending application Ser. No. 09/562,167 filed May 2, 2000. The apparatus includes a container for the reception therein of the feed. The container has a base and a wall extending away from the base. The wall defines an opening which is disposed remote from the base for the reception therethrough of the feed. The arrangement is such that the base and the wall define therebetween an enclosure for the feed received through the opening. An auger is rotatably disposed within the enclosure for mixing the feed. Also, the wall further defines an outlet which is disposed between the base and the opening, the outlet permitting discharge therethrough of the feed. A door is disposed adjacent to the outlet, the door being movable from a closed disposition thereof for obturating a discharge of the feed through the outlet when the feed is being mixed to an open disposition thereof for permitting a discharge of the feed when mixed through the outlet. Additionally, a deflector is disposed adjacent to the outlet for deflecting the feed when mixed through the outlet.

21 Claims, 7 Drawing Sheets

DISCHARGE APPARATUS FOR A MIXER FOR MIXING AND DISCHARGING LIVESTOCK FEED AND THE LIKE

CROSS REFERENCE TO RELATED PATENT APPLICATIONS

The subject application is a continuation-in-part of parent application U.S. Ser. No. 09/562,167 filed May 2, 2000 now U.S. Pat. No. 6,409,376. All the subject matter of co-pending U.S. Ser. No. 09/562,167 is incorporated herein by reference.

BACKGROUND OF THE INVENTION

1. Field of the Invention

The present invention relates to a discharge apparatus for a mixer for mixing and discharging livestock feed and the like. More specifically, the present invention relates to a discharge apparatus for a mixer having an auger rotating about a vertical axis.

2. Information Disclosure Statement

Cattle farming requires the mixing of various livestock feeds for subsequent distribution. Additionally, mixers can be used for mixing other materials such as composts and the like. Sometimes such mixing of feeds includes depositing at least one bale of hay into a mixer container together with other additives. The materials within the container are mixed by means of at least one auger which rotates within the container so that an intimate mixing of the contents of the container is obtained. Although many mixers employ a pair of horizontal interacting augers extending longitudinally along the container, several mixers have been proposed in which the auger or augers are disposed vertically.

In the prior art mixers of the vertical auger type, such mixers sometimes include a pair of augers in which the rotational axes of the augers are disposed spaced and parallel relative to each other. Furthermore, each of such augers is driven by a separate drive which supplies rotary motion to each of the augers from below.

Also, some mixers have a single auger. However, whether a single or a twin vertical auger type mixer, the discharge of mixed feed from the mixer container is not easy to control. Prior art mixers employ a door in the wall of the container so that when mixing has been completed, the door is opened so that rotation of the auger causes the mixed feed to discharge through the discharge outlet and open door. However, although there is a tendency for the feed to discharge out of the discharge outlet when the door is opened, some materials will continue rotating in the enclosure.

Accordingly, the present invention includes a deflector located in the vicinity of the door in order to assist in forcing the materials in a controlled manner out of the discharge outlet.

Therefore, it is a primary feature of the present invention to provide a discharge apparatus for a mixer which overcomes the aforementioned problems associated with the prior art vertical auger mixers and which provides a significant contribution to the art of mixing animal feeds and the like.

Another feature of the present invention is the provision of a discharge apparatus that permits a controlled discharge of materials from a mixer.

Other features and advantages of the discharge apparatus according to the present invention will be readily apparent to those skilled in the art by a consideration of the detailed description contained herein of a preferred embodiment of the present invention.

SUMMARY OF THE INVENTION

The present invention relates to a discharge apparatus for a mixer for mixing and discharging livestock feed and the like. The apparatus includes a container for the reception therein of the feed. The container has a base and a wall extending away from the base. The wall defines an opening which is disposed remote from the base for the reception therethrough of the feed. The arrangement is such that the base and the wall define therebetween an enclosure for the feed received through the opening. An auger is rotatably disposed within the enclosure for mixing the feed. Also, the wall further defines an outlet which is disposed between the base and the opening, the outlet permitting discharge therethrough of the feed. A door is disposed adjacent to the outlet, the door being movable from a closed disposition thereof for obturating any discharge of the feed through the outlet when the feed is being mixed to an open disposition thereof for permitting a discharge through the outlet of the feed when mixed. Additionally, a deflector is disposed adjacent to the outlet for deflecting the feed through the outlet when mixed.

In a more specific embodiment of the present invention, the container further includes a frame for supporting the base.

Moreover, the container further includes a plurality of wheels rotatably secured to the frame for permitting transportation of the mixer.

Also, the container includes a hitch bar secured to the frame for facilitating transportation of the mixer by a tractor or the like. Additionally, the wall extends angularly away from the base.

In one embodiment of the present invention, the discharge apparatus includes at least one expeller disposed outside the enclosure for moving the feed through the outlet away from the enclosure.

In another embodiment of the present invention, the discharge apparatus further includes a conveyor disposed outside the enclosure for conveying the feed through the outlet away from the enclosure.

The auger is rotatable about an axis which extends through the base and the base defines an aperture for permitting rotatable driving of the auger, the axis extending through the aperture.

The discharge apparatus also includes a bearing which extends through the aperture, the bearing permitting rotation of the auger within the enclosure.

Additionally, the outlet includes a leading edge and a trailing edge, the trailing edge having a first and a second end. The trailing edge is disposed downstream relative to the leading edge taken in a rotational direction of the auger.

More specifically, the leading and trailing edges are disposed parallel relative to each other and the door is movable in a first direction from the opening towards the base to the closed disposition thereof and in a second direction from the base towards the opening to the open disposition thereof.

The discharge apparatus further includes an actuator which is connected to the wall and which extends between the wall and the door for moving the door between the closed and open dispositions thereof.

The deflector is secured to the trailing edge of the outlet and in one embodiment of the present invention, the deflector is a fixed plate applied to the trailing edge.

In another embodiment of the present invention, the deflector includes a plate having a first and a second extremity. The first extremity is pivotally secured to the wall adjacent to the first end of the trailing edge. The arrangement is structured such that when the door is disposed in the open disposition thereof, the discharge of feed when mixed is increased when the plate is pivoted from a first location of the plate in which less of the plate is disposed within the enclosure to a second location of the plate in which more of the plate is disposed within the enclosure.

More specifically, the discharge of feed when mixed is progressively increased when the auger rotates at a constant rotational speed and when the plate is pivoted from the first towards the second location thereof.

Additionally, the plate has an inboard and an outboard face, the plate defining a slot having a first and a second side. The first side of the slot is disposed adjacent to the first extremity of the plate and the second side of the slot is disposed adjacent to the second extremity of the plate. The first side of the slot is disposed further from the outboard face of the plate than the second side of the slot.

The apparatus further includes a pin which extends through the slot and is slidably guided by the slot. Also, the pin is rigidly secured to the door. The arrangement is such that movement of the door from the closed disposition towards the open disposition thereof causes movement of the pin between the first and second sides of the slot so that the plate is pivoted between the first and second locations thereof.

More specifically, movement of the door from the closed disposition towards the open disposition thereof causes the plate to move from the first towards the second location thereof so that as the door moves to the open disposition, the plate is pivoted into the enclosure for deflecting an increased discharge of the feed when mixed through the outlet.

Furthermore, the plate is a sector in which the first extremity of the plate is disposed adjacent to a center of curvature of the sector and the second extremity is disposed adjacent to a circumference of the sector.

In another aspect of the present invention, a discharge apparatus for a mixer has a deflector which includes a fixed plate which is disposed adjacent to the trailing edge of the outlet, the fixed plate being located between the trailing edge and the door.

In yet another aspect of the present invention, a discharge apparatus for a mixer includes a tray disposed outside the enclosure for conveying the feed away from the outlet.

Many modifications and variations of the present invention will be readily apparent to those skilled in the art by a consideration of the detailed description of a preferred embodiment of the present invention contained herein taken in conjunction with the annexed drawings. However, such modifications and variations fall within the spirit and scope of the present invention as defined by the appended claims.

Included in such modifications and variations would be an arrangement in which the door is of the clam shell type. Also, the door could slide sideways rather than sliding in an upward and downward direction.

BRIEF DESCRIPTION OF THE DRAWINGS

Similar reference characters refer to similar parts throughout the various embodiments of the present invention.

DETAILED DESCRIPTION OF THE DRAWINGS

Figure 1:
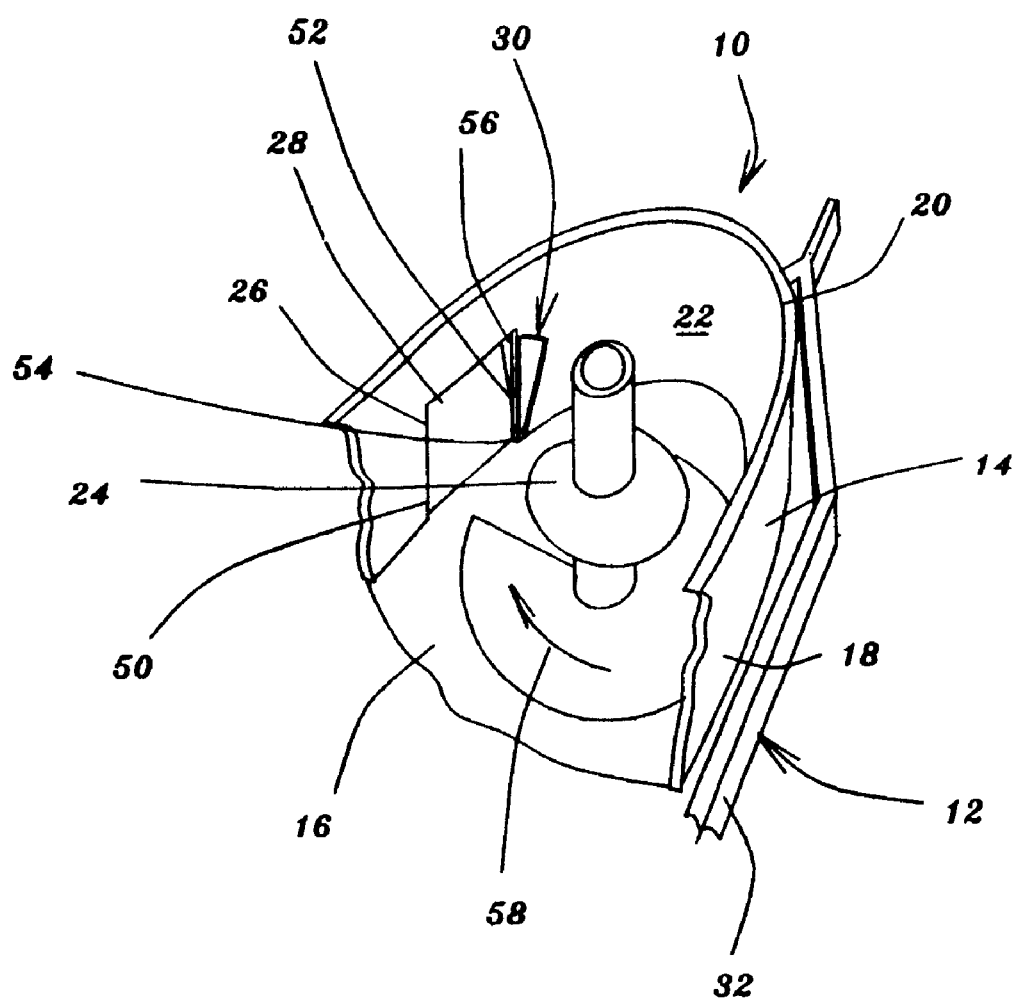
FIG. 1 is a fragmentary perspective view showing a discharge apparatus for a mixer for mixing and discharging livestock feed and the like according to the present invention.

FIG. 1 is a fragmentary perspective view of a discharge apparatus generally designated 10 for a mixer generally designated 12 for mixing and discharging livestock feed and the like according to the present invention. The apparatus 10 includes a container 14 for the reception therein of the feed. The container 14 has a base 16 and a wall 18 extending away from the base 16. The wall 18 defines an opening 20 which is disposed remote from the base 16 for the reception therethrough of the feed. The arrangement is such that the base 16 and the wall 18 define therebetween an enclosure 22 for the feed received through the opening 20. An auger 24 is rotatably disposed within the enclosure 22 for mixing the feed. Also, the wall 18 further defines an outlet 26 which is disposed between the base 16 and the opening 20, the outlet 26 permitting discharge therethrough of the feed. A door 28 is disposed adjacent to the outlet 26, the door 28 being movable from a closed disposition thereof, as shown in FIG. 1, for obturating a discharge of the feed through the outlet 26 when the feed is being mixed to an open disposition thereof for permitting a discharge of the feed when mixed through the outlet 26. Additionally, a deflector generally designated 30 is disposed adjacent to the outlet 26 for deflecting the feed when mixed through the outlet 26.

In a more specific embodiment of the present invention, the container 14 further includes a frame 32 for supporting the base 16 thereon.

Figure 2:
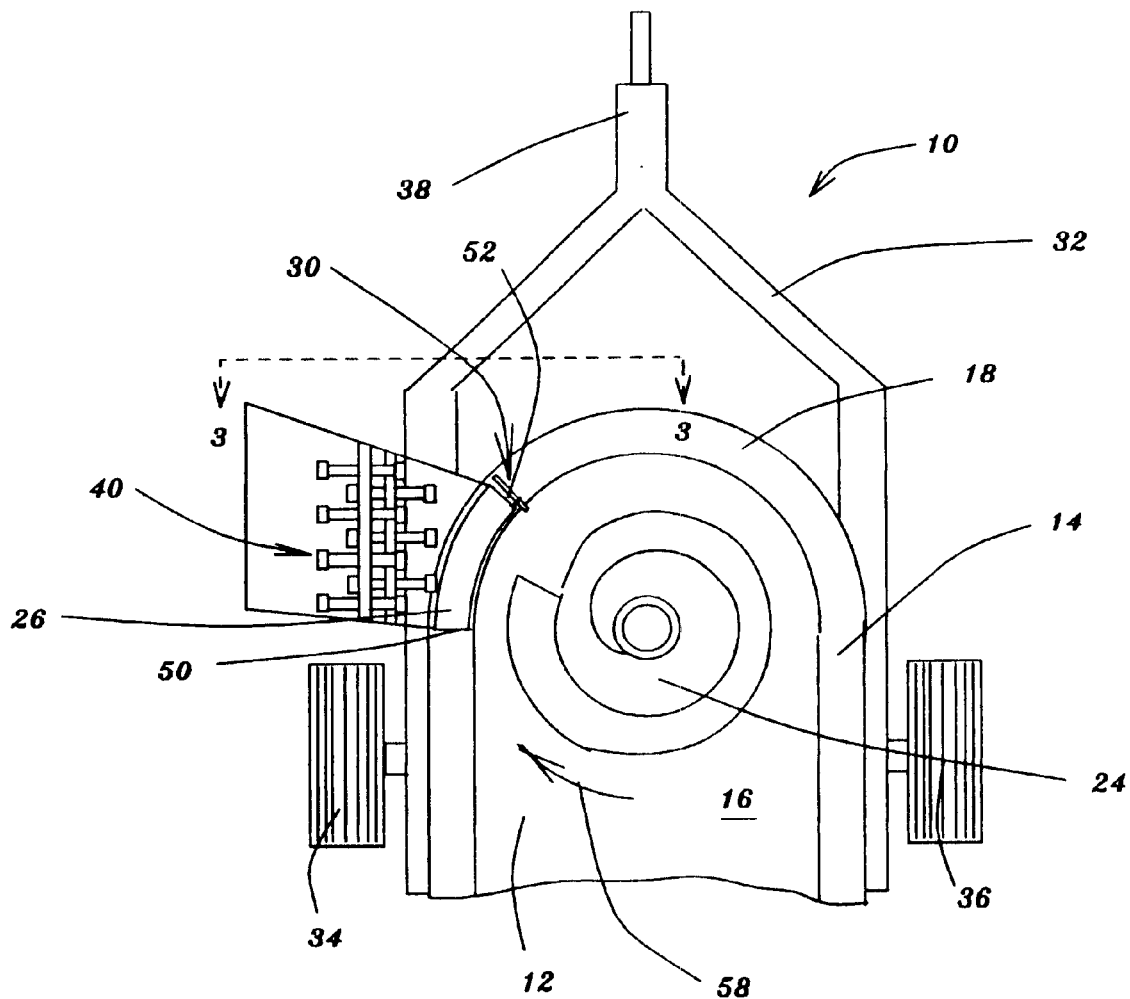
FIG. 2 is a top plan view of the apparatus 10 shown in FIG. 1.

FIG. 2 is a top plan view of the apparatus 10 shown in FIG. 1. As shown in FIG. 2, the container 14 further includes a plurality of wheels 34 and 36 which are rotatably secured to the frame 32 for permitting transportation of the mixer 12.

Also, the container 14 further includes a hitch bar 38 secured to the frame 32 for facilitating transportation of the mixer 12 by a tractor or the like (not shown). Also, the wall 18 extends angularly away from the base 16.

Figure 3:
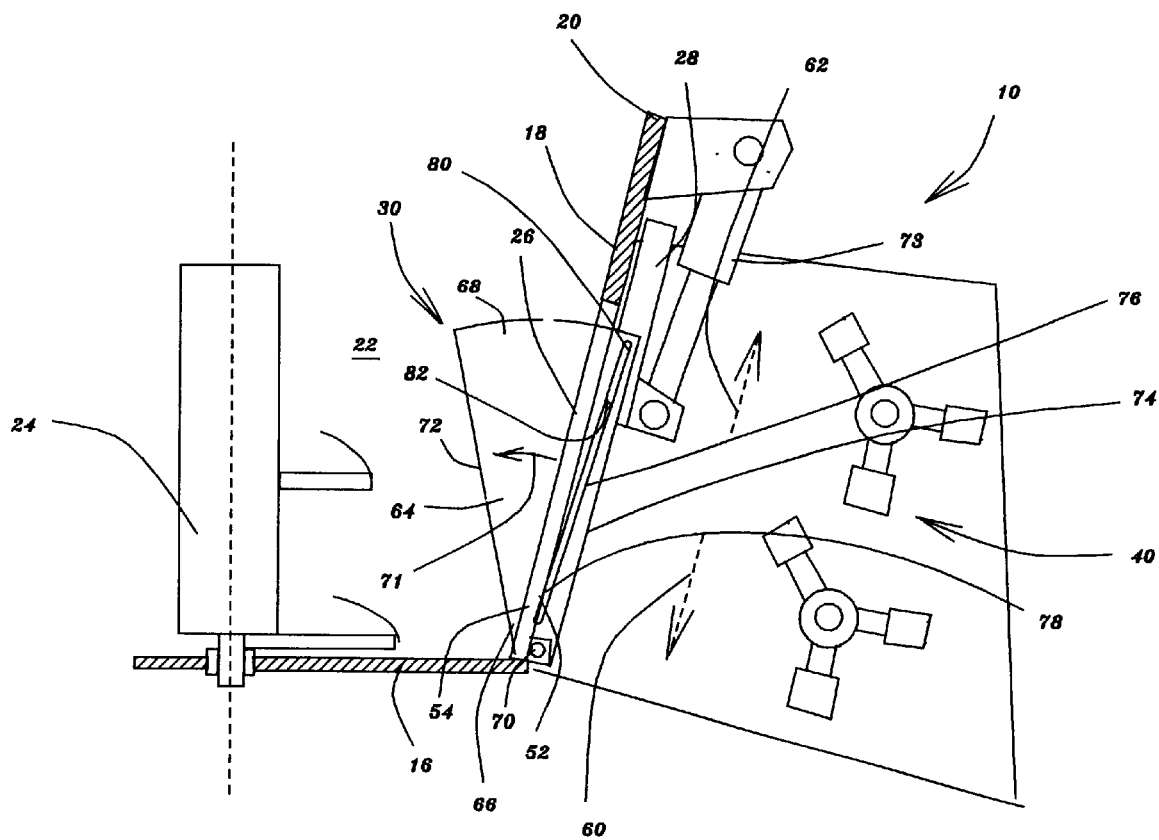
FIG. 3 is a sectional view taken on the line 3—3 of FIG. 2.

FIG. 3 is a sectional view taken on the line 3—3 of FIG. 2. As shown in FIG. 3, the discharge apparatus 10 includes at least one expeller generally designated 40 disposed outside the enclosure 22 for moving the feed through the outlet 26 away from the enclosure 22.

Figure 4:
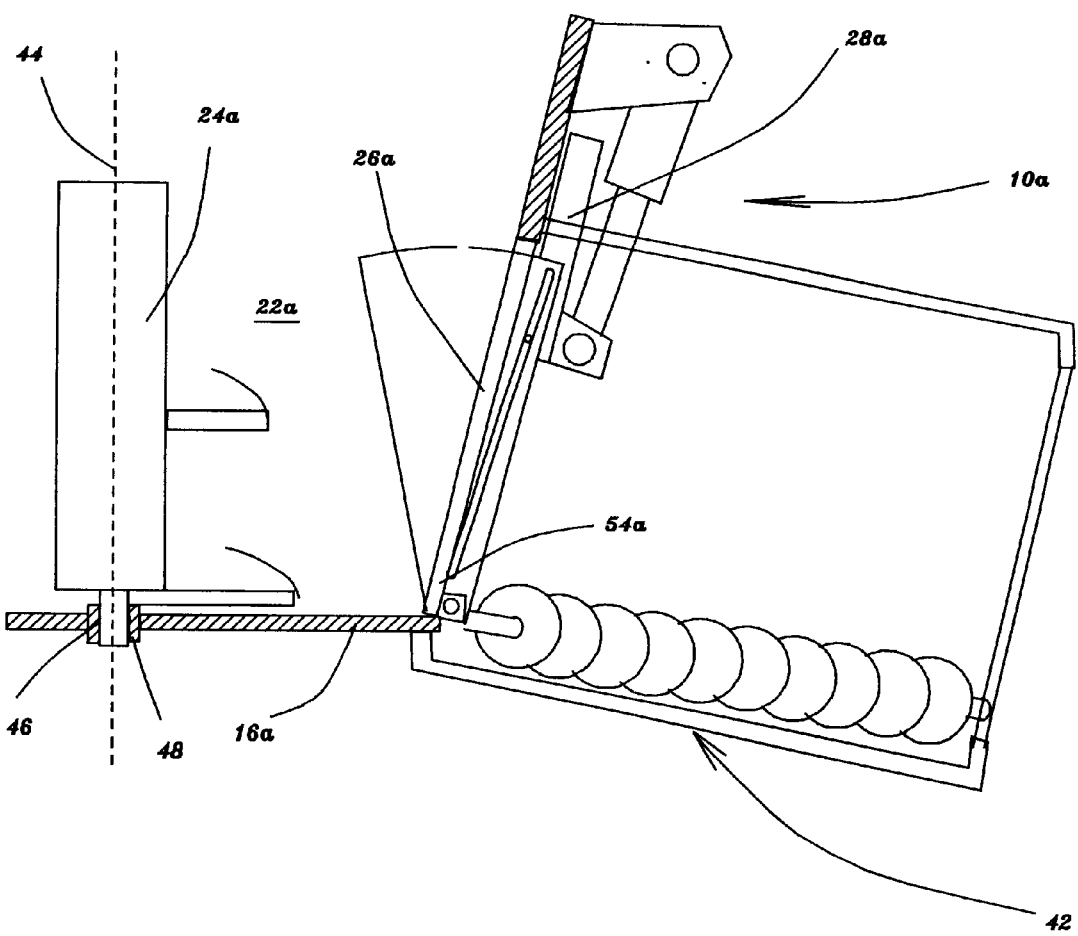
FIG. 4 is a similar view to that shown in FIG. 3 but shows another embodiment of the present invention.

FIG. 4 is a similar view to that shown in FIG. 3 but shows another embodiment of the present invention. As shown in FIG. 4, the discharge apparatus 10a further includes a conveyor generally designated 42 disposed outside the enclosure 22a for conveying the feed through the outlet 26a away from the enclosure 22a. The conveyor 42 is a screw type conveyor which includes three conveyors which rotate about axes disposed spaced and parallel relative to one another. The axes of the conveyors generally lie in the same plane and interact with one another so that when the conveyors are rotated, feed is discharged from the door away from the mixer. Instead of a screw type conveyor, a belt or chain and slat type conveyor or any other type of conveyor could be used.

As shown in FIG. 4, the auger 24a is rotatable about an axis 44 which extends through the base 16a and the base 16a defines an aperture 46 for permitting rotatable driving of the auger 24a, the axis 44 extending through the aperture 46.

The discharge apparatus 10a also includes a bearing 48 which extends through the aperture 46, the bearing 48 permitting rotation of the auger 24a within the enclosure 22a.

As shown in FIG. 2, the outlet 26 includes a leading edge 50 and a trailing edge 52. The trailing edge 52 has a first and a second end 54 and 56 respectively as shown in FIG. 1. The trailing edge 52 is disposed downstream relative to the leading edge 50 taken in a rotational direction of the auger 24 as indicated by the arrow 58 as shown in FIGS. 1 and 2.

More specifically, the leading and trailing edges 50 and 52 respectively are disposed approximately parallel relative to each other. Also, as shown in FIG. 3, the door 28 is movable in a first direction as indicated by the arrow 60 from the opening 20 towards the base 16 to the closed disposition thereof and in a second direction as indicated by the arrow 62 from the base 16 towards the opening 20 to the open disposition of the door as shown in FIG. 3.

The discharge apparatus 10 further includes an actuator 73 which is connected to the wall 18 and which extends between the wall 18 and the door 28 for moving the door 28 between the closed and open dispositions thereof. Additionally, the deflector 30 is secured to the trailing edge 52 of the outlet 26.

Figure 5:
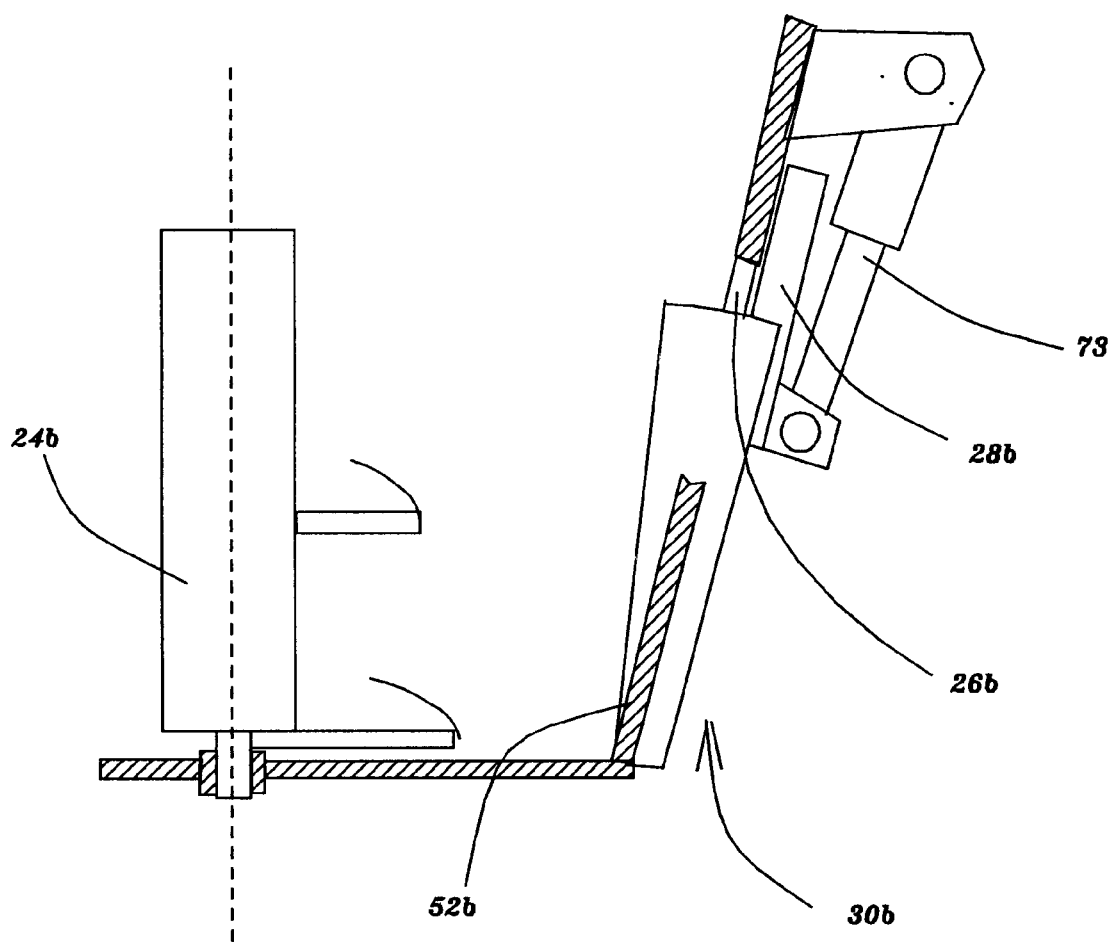
FIG. 5 is a similar view to that shown in FIG. 3 but shows another embodiment of the present invention.

FIG. 5 is a similar view to that shown in FIG. 3 but shows another embodiment of the present invention. As shown in FIG. 5, the deflector 30b is a fixed plate which is applied to the trailing edge 52b.

In a preferred embodiment of the present invention as shown in FIG. 3, the deflector generally designated 30 includes a plate 64 having a first and a second extremity 66 and 68 respectively. The first extremity 66 is pivotally connected about axis 70 to the wall 18 adjacent to the first end 54 of the trailing edge 52. The arrangement is structured such that when the door 28 is disposed in the open disposition thereof as shown in FIG. 3, the discharge of feed through the outlet when mixed is increased when the plate 64 is pivoted in a direction as indicated by arrow 71 from a first location of the plate 64 in which less of the plate 64 is disposed within the enclosure 22 to a second location of the plate 64 in which more of the plate 64 is disposed within the enclosure 22.

The discharge of feed through the outlet 26 when mixed is progressively increased when the auger 24 rotates at a constant rotational speed and when the plate 64 is pivoted from the first location towards the second location thereof.

Additionally, the plate 64 has an inboard and an outboard face 72 and 74 respectively, the plate 64 defining a slot 76 having a first and a second side 78 and 80 respectively. The first side 78 of the slot 76 is disposed adjacent to the first extremity 66 of the plate 64 and the second side 80 of the slot 76 is disposed adjacent to the second extremity 68 of the plate 64. The first side 78 of the slot 76 is disposed further from the outboard face 74 of the plate 64 than the second side 80 of the slot 76.

The apparatus 10 further includes a pin 82 which extends through the slot 76 and is slidably guided by the slot 76. The pin 82 is rigidly secured to the door 28. The arrangement is such that movement of the door 28 from the closed disposition as shown in FIG. 1 towards the open disposition thereof as shown in FIG. 3, causes movement of the pin 82 between the first and second sides 78 and 80 respectively of the slot 76 so that the plate 64 is pivoted between the first and second locations thereof.

More specifically, movement of the door 28 from the closed disposition towards the open disposition thereof causes the plate 64 to move as indicated by arrow 71 from the first towards the second location thereof so that as the door 28 moves to the open disposition, the plate 64 is pivoted into the enclosure 22 for deflecting an increased discharge of the feed when mixed through the outlet 26.

Furthermore, as shown in FIG. 3. the plate 64 is a sector in which the first extremity 66 of the plate 64 is disposed adjacent to a center of curvature of the sector and the second extremity 68 is disposed adjacent to a circumference of the sector.

Figure 6:
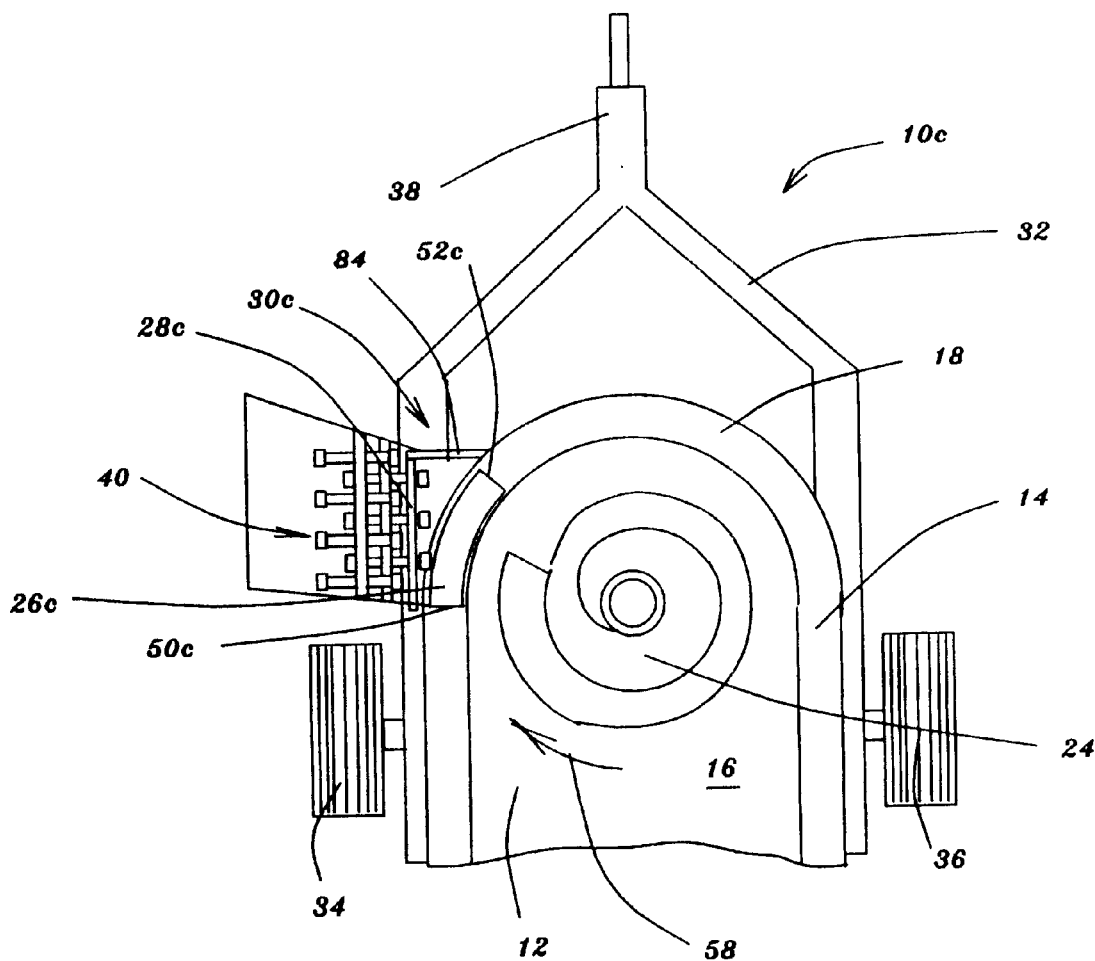
FIG. 6 is a similar view to that shown in FIG. 2 but shows another embodiment of the present invention in which the deflector includes a fixed plate.

FIG. 6 is a similar view to that shown in FIG. 2 but shows another embodiment of the present invention. As shown in FIG. 6, a discharge apparatus 10c for a mixer has a deflector 30c which includes a fixed plate 84 which is disposed adjacent to the trailing edge 52c of the outlet 26c, the fixed plate 84 being located between the trailing edge 52c and the door 28c. In the aforementioned arrangement, when the door is closed, the feed fills the outward space between the outlet 26c and the door 28c thus allowing the feed to flow in its circular pattern around the auger 24 with minimum impedence from the door 28c.

Although in a preferred embodiment of the present invention, the deflector 30 is a plate 64 which pivots about a horizontal axis of rotation 70, it will be appreciated by those skilled in the art that the deflector could be a plate which pivots about a vertical axis or which is arranged to slide within guides into and out of the enclosure.

Additionally, throughout the subject application and claims, the term "conveyor" is to be understood as including alternatively a screw conveyor, a belt conveyor and a chain and slat type conveyor.

Furthermore, the deflector 30 could be either hydraulically or electrically driven and controlled and could include a deflector position sensing arrangement. The deflector 30 could include an electrically driven ball screw arrangement and the movement of the deflector 30 could also be independent of movement of the door 28.

Figure 7:
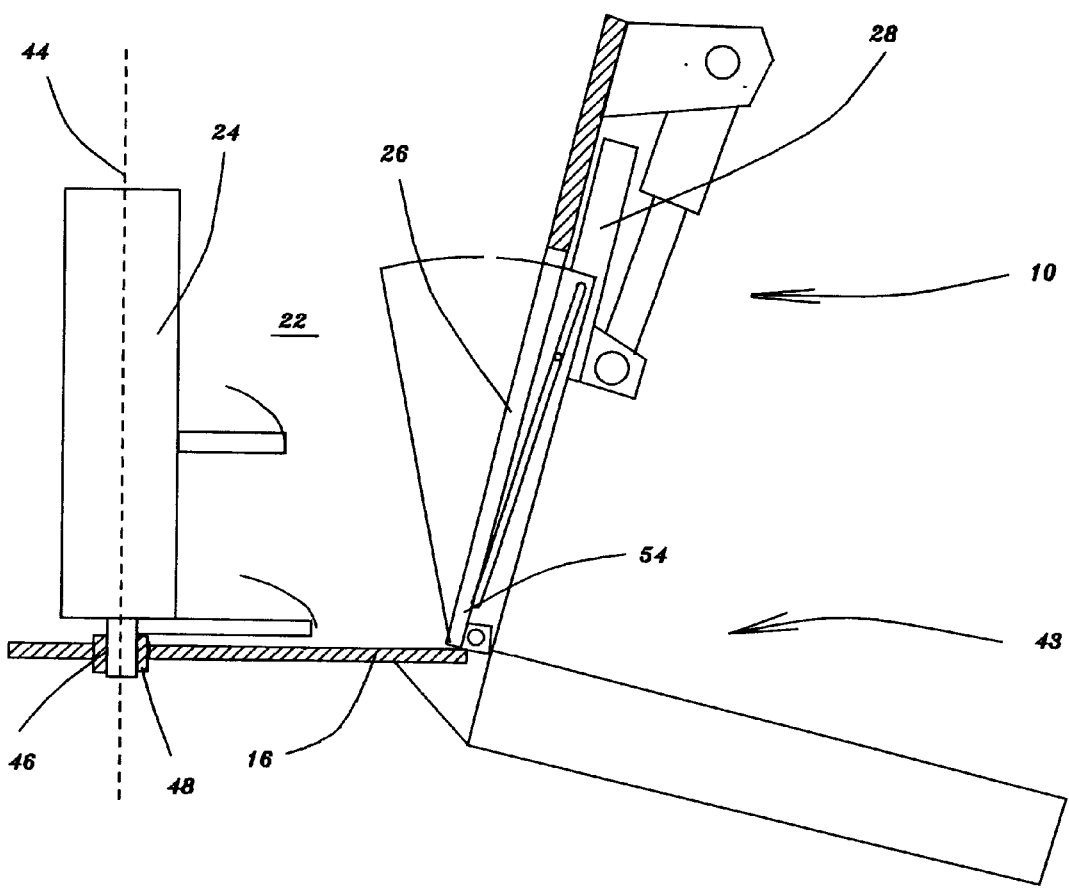
FIG. 7 is a similar view to that shown in FIG. 4 but shows a further embodiment of the present invention including a tray.

FIG. 7 is a similar view to that shown in FIG. 4 but shows a further embodiment of the present invention including a tray. As shown in FIG. 7, a discharge apparatus for a mixer includes a tray 43 disposed outside the enclosure 22 for conveying the feed away from the outlet 26.

The present invention provides a discharge apparatus for a vertical auger mixer having a number of unique features which greatly increases the ability of the user thereof to control the discharge of mixed materials from such a mixer.

What is claimed is:

1. A discharge apparatus for a mixer for mixing and discharging livestock feed and the like, said apparatus comprising:

a container for the reception therein of the feed;
said container including:
a base;
a wall extending away from said base, said wall defining an opening disposed remote from said base for the reception therethrough of the feed, the arrangement being such that said base and said wall define therebetween an enclosure for the feed received through said opening;
an auger rotatably disposed within said enclosure for mixing the feed;
said wall further defining an outlet disposed between said base and said opening, said outlet permitting discharge therethrough of the feed;

a door disposed adjacent to said outlet, said door being movable from a closed disposition thereof for obturating a discharge of the feed through said outlet when the feed is being mixed to an open disposition thereof for permitting a discharge of the feed when mixed through said outlet; and a deflector disposed adjacent to said outlet for deflecting the feed when mixed through said outlet.

2. A discharge apparatus for a mixer as set forth in claim 1 wherein said container further includes:
a frame for supporting said base thereon.

3. A discharge apparatus for a mixer as set forth in claim 2 wherein said container further includes:
a plurality of wheels rotatably secured to said frame for permitting transportation of said mixer.

4. A discharge apparatus for a mixer as set forth in claim 3 wherein said container further includes:
a hitch bar secured to said frame for facilitating transportation of said mixer by a tractor or the like.

5. A discharge apparatus for a mixer as set forth in claim 1 wherein said wall extends angularly away from said base.

6. A discharge apparatus for a mixer as set forth in claim 1 further including:

at least one expeller disposed outside said enclosure for moving the feed away from said outlet.

7. A discharge apparatus for a mixer as set forth in claim 1 further including:

a conveyor disposed outside said enclosure for conveying the feed away from said outlet.

8. A discharge apparatus for a mixer as set forth in claim 1 further including:

a tray disposed outside said enclosure for guiding the feed away from said outlet.

9. A discharge apparatus for a mixer as set forth in claim 1 wherein said auger is rotatable about an axis extending through said base;

said base defining an aperture for permitting a rotatable driving of said auger, said axis extending through said aperture.

10. A discharge apparatus for a mixer as set forth in claim 9 further including:

a bearing extending through said aperture, said bearing permitting rotation of said auger within said enclosure.

11. A discharge apparatus for a mixer as set forth in claim 1 wherein said outlet includes:
a leading edge;
a trailing edge having a first and a second end, said trailing edge being disposed downstream relative to said leading edge taken in a rotational direction of said auger.

12. A discharge apparatus for a mixer as set forth in claim 11 wherein said leading and trailing edges are disposed approximately parallel relative to each other.

13. A discharge apparatus for a mixer as set forth in claim 11 wherein said deflector is secured adjacent to said trailing edge of said outlet.

14. A discharge apparatus for a mixer as set forth in claim 13 wherein said deflector is a fixed plate applied to said trailing edge.

15. A discharge apparatus for a mixer as set forth in claim 11 wherein said deflector includes:
a plate having a first and a second extremity, said first extremity being pivotally secured to said wall adjacent to said trailing edge, the arrangement being structured such that when said door is disposed in said open disposition thereof, said discharge of feed through said outlet when mixed is increased when said plate is pivoted from a first location of said plate in which less of said plate is disposed within said enclosure to a second location of said plate in which more of said plate is disposed within said enclosure.

16. A discharge apparatus for a mixer as set forth in claim 15 wherein said discharge of feed through said outlet when mixed is progressively increased when said auger rotates at a constant rotational speed and when said plate is pivoted from said first location towards said second location thereof.

17. A discharge apparatus for a mixer as set forth in claim 15 wherein said plate has an inboard and an outboard face, said plate defining a slot having a first and a second side, said first side of said slot being disposed adjacent to said first extremity of said plate, said second side of said slot being disposed adjacent to said second extremity of said plate, said first side of said slot being disposed further from said outboard face of said plate than said second side of said slot;

said apparatus further including:
a pin extending through said slot and slidably guided by said slot, said pin being rigidly secured to said door, the arrangement being such that movement of said door from said closed disposition towards said open disposition thereof causes movement of said pin between said first and second sides of said slot so that said plate is pivoted between said first and second locations thereof.

18. A discharge apparatus for a mixer as set forth in claim 15 wherein movement of said door from said closed disposition towards said open disposition thereof causes said plate to move from said first towards said second location thereof so that as said door moves to said open disposition, said plate is pivoted into said enclosure for deflecting an increased discharge of feed through said outlet.

19. A discharge apparatus for a mixer as set forth in claim 15 wherein said plate is a sector in which said first extremity of said plate is disposed adjacent to a center of curvature of said sector and said second extremity is disposed adjacent to a circumference of said sector.

20. A discharge apparatus for a mixer as set forth in claim 1 wherein said door is movable in a first direction from said opening towards said base to said closed disposition thereof and in a second direction from said base towards said opening to said open disposition thereof.

21. A discharge apparatus for a mixer as set forth in claim 1 further including:

an actuator connected to said wall and extending between said wall and said door for moving said door between said closed and open dispositions thereof.

* * * * *